(12) United States Patent
Oberheide

(10) Patent No.: US 6,810,622 B2
(45) Date of Patent: Nov. 2, 2004

(54) POWER SLIDING CAB WINDOW

(75) Inventor: G. Clarke Oberheide, Troy, MI (US)

(73) Assignee: Intier Automotive Closures Inc., Newmarket (CA)

( * ) Notice: Subject to any disclaimer, the term of this patent is extended or adjusted under 35 U.S.C. 154(b) by 36 days.

(21) Appl. No.: 10/288,892

(22) Filed: Nov. 6, 2002

(65) Prior Publication Data

US 2003/0089043 A1 May 15, 2003

Related U.S. Application Data

(60) Provisional application No. 60/332,821, filed on Nov. 6, 2001.

(51) Int. Cl.$^7$ ............... E05F 11/34; E05F 11/00; E05F 17/00
(52) U.S. Cl. ............... 49/362; 49/360; 49/118
(58) Field of Search ............... 49/360, 118, 120, 49/380, 125, 362, 349, 352, 413

(56) References Cited

U.S. PATENT DOCUMENTS

| | | | |
|---|---|---|---|
| 3,469,345 A | * | 9/1969 | Hanks ............... 49/362 |
| 3,918,201 A | | 11/1975 | Graziano |
| 4,995,195 A | | 2/1991 | Olberding et al. |
| 5,613,323 A | | 3/1997 | Buening |
| 5,669,181 A | * | 9/1997 | Kollar et al. ............... 49/360 |
| 5,724,769 A | | 3/1998 | Cripe et al. |
| 5,784,833 A | * | 7/1998 | Sponable et al. ............... 49/360 |
| 5,822,922 A | | 10/1998 | Grumm et al. |
| 5,826,377 A | | 10/1998 | Simson et al. |
| 6,026,611 A | * | 2/2000 | Ralston et al. ............... 49/360 |
| 6,112,462 A | | 9/2000 | Kolar |
| 6,125,585 A | | 10/2000 | Koneval et al. |
| 6,324,788 B1 | * | 12/2001 | Koneval et al. ............... 49/121 |
| 6,591,552 B1 | * | 7/2003 | Rasmussen ............... 49/121 |

* cited by examiner

Primary Examiner—Hugh B. Thompson, II
(74) Attorney, Agent, or Firm—Clark Hill PLC

(57) ABSTRACT

A power sliding assembly for moving a windowpane within a track within a window frame between an open position and a closed position. The power sliding assembly includes a motor fixedly secured to the window frame. The motor generates a rotational force. The power sliding assembly also includes a lead screw that is operatively connected to the motor to translate the rotational force to axial movement. In addition, the power sliding assembly includes a bracket secured to the lead screw and the windowpane. The bracket travels with the lead screw as the lead screw is driven axially along the track to move the windowpane between the open and closed positions.

25 Claims, 4 Drawing Sheets

POWER SLIDING CAB WINDOW

This application claims benefit of Ser. No. 60/332,821 Nov. 6, 2001.

FIELD OF THE INVENTION

This invention relates to a power sliding assembly for moving a windowpane of a motor vehicle. More particularly, the invention relates to a power sliding assembly having a lead screw that is driven axially by a motor to open and close a windowpane.

DESCRIPTION OF THE RELATED ART

Motor vehicles typically include window assemblies having sliding windowpanes that move between an open position and a closed position. A pick-up truck includes one such window assembly for covering a rear window opening along a back end of a passenger compartment, commonly referred to as a cab. The window assembly in these types of motor vehicles includes a window frame extending along the rear window opening, at least one fixed windowpane, and one or more movable windowpanes that slide relative to the fixed windowpane along a track of the window frame.

For the convenience of occupants of the pick-up truck, window assemblies have been developed in which the movement of the movable windowpane is automated. These window assemblies utilize a motor remote from the movable windowpane. The motor may be secured to a floor of a passenger compartment and connected to the movable windowpane by push-pull cabling. This system is, however, inefficient as it consumes a great deal of power. In addition, this system has difficulty operating in colder climates due to the necessity for many polymeric drive components.

Numerous attempts have been made to provide a more efficient system for moving the movable windowpane. For example, U.S. Pat. No. 4,995,195 to Olberding et al. discloses an automatic rear window opener for a motor vehicle. An automatic rear window includes a frame having lateral sides and a bottom. A track extends along the bottom of the frame. A stationary side windowpane is located at each side of the frame and a pair of movable windowpanes are supported on the track. A motor includes rotatable output shafts extending laterally therefrom. Left and right-hand threaded shafts are attached to the output shafts on opposite sides of the motor. Brackets engage each of the left and right-hand threaded shafts and move in opposite directions along the left and right-hand threaded shafts when the motor is activated. The movable windowpanes are attached to the brackets so that as the brackets move along the left and right-hand threaded shaft, the movable windowpanes move between an open position and a closed position.

SUMMARY OF THE INVENTION

According to one aspect of the invention, a power sliding assembly moves a windowpane within a track formed within a window frame between an open position and a closed position. A motor is fixedly secured to the window frame. The motor generates a rotational force. A lead screw is operatively connected to the motor. The lead screw receives the rotational force and moves axially alongside the track. A bracket is secured to the lead screw and the windowpane. The bracket moves the windowpane between the open and closed positions as the bracket travels with the lead screw as the lead screw is driven axially alongside the track.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE RELATED ART

Figure 1:
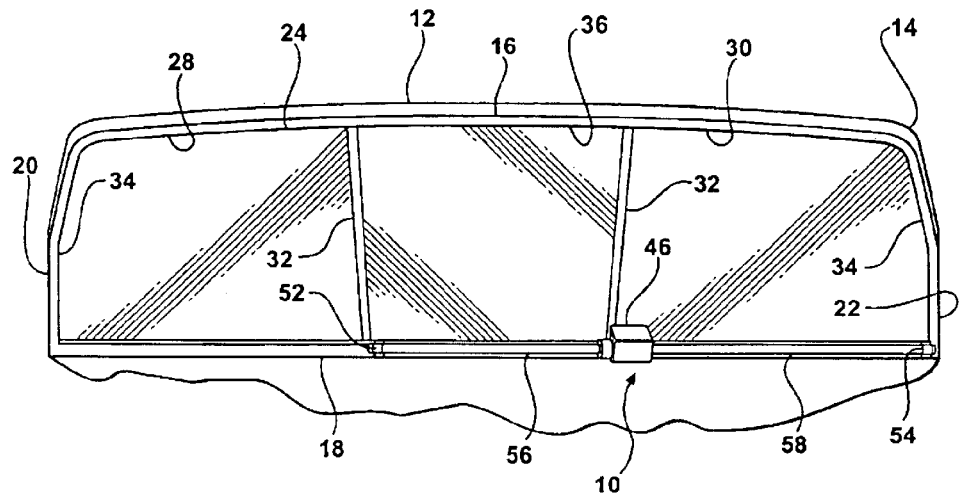
FIG. 1 is a perspective view of a window frame incorporating a power sliding assembly of one embodiment of the invention with a windowpane in a closed position.
Figure 2:
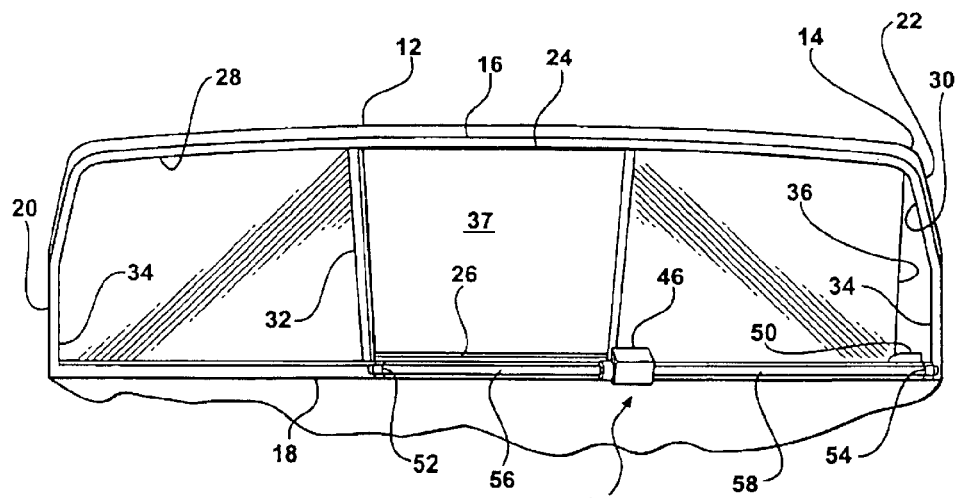
FIG. 2 is a perspective view of the window frame incorporating the power sliding assembly of one embodiment of the invention with the windowpane in the open position.
Figure 3:
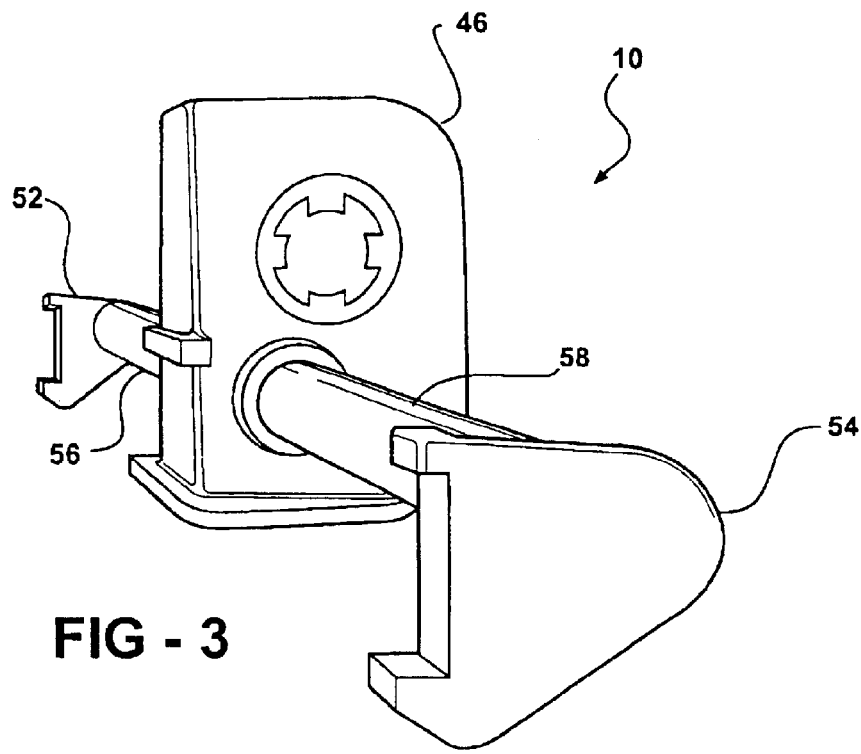
FIG. 3 is an isolated perspective view of one embodiment of the invention.

Referring to FIGS. 1 through 5, a first embodiment of a power sliding assembly, generally indicated at 10, is secured to a window frame 12 of a motor vehicle 14. The window frame 12 includes a top portion 16, a bottom portion 18, and sides 20, 22 extending therebetween. An upper guide 24 extends along a top portion 16 of the window frame 12 between the sides 20, 22 thereof, and a track 26 extends along the bottom portion 18 of the window frame 12 between the sides 20, 22 thereof.

The window frame 12 includes side windowpanes 28, 30 that are fixed therewithin. Each of the side windowpanes 28, 30 include inner 32 and outer 34 sides extending between the top 16 and bottom 18 portions. Each outer side 34 is disposed adjacent to one of the sides 20, 22 of the window frame 12.

A center windowpane 36 is positioned within the track 26 along the bottom portion 18 of the window frame 12. The center windowpane 36 moves in a reciprocating manner along the track 26 relative to the fixed side windowpanes 28, 30. The center windowpane 36 is movable between a closed position (FIG. 1), in which the center windowpane 36 overlaps the inner sides 32 of the side windowpanes 28, 30, and an open position (FIG. 2) in which the center windowpane 36 overlaps only one of the side windowpane 30 leaving an opening 37 for air to pass therethrough. The center windowpane 36 may also be moved to a plurality of positions between the closed and open positions.

A motor 40 is fixedly secured to a structure that is stationary with respect to the center windowpane 36, e.g., the window frame 12. The motor 40 generates a rotational force upon activation thereof. A drive mechanism, generally shown at 42, is operatively connected to the motor 40. The drive mechanism 42 includes a drive nut 44 that is rotatably connected to the motor 40. The motor 40 and the drive mechanism 42 are secured to a motor bracket 46, which is fixedly secured to the window frame 12.

A lead screw 48, which includes a free end 47, is operatively connected to the motor 40. The lead screw 48 extends through the drive nut 44 and the motor bracket 46. Upon activation of the motor 40, the rotational force generated by the motor 40 rotates the drive nut 44 which, in turn, moves the lead screw 48 axially alongside the track 26.

A bracket 50 is secured to the lead screw 48 and to the center windowpane 36 fixing the relative positions with respect to each other. The bracket 50 travels with the lead screw 48 which moves the center windowpane 36 between the open and closed positions as the lead screw 48 is driven axially alongside the track 26.

End supports 52, 54 are positioned along the bottom portion 18 of the window frame 12 and outside of the track 26 thereof. More specifically, the end support 52 is disposed adjacent the inner side 32 of the side windowpane 28, and the end support 54 is disposed adjacent the outer side 34 of the side windowpane 30.

Cover tubes 56, 58 extend between the end supports 52, 54. The cover tubes 56, 58 together extend along a portion of the bottom portion 18 of the window frame 12. The cover tube 56 extends between the end support 52 and the motor bracket 46 while the cover tube 58 extends between the motor bracket 46 and the end support 54. Additionally, at least a portion of the motor bracket 46 is positioned between the end supports 52, 54. The cover tubes 56, 58 are coaxial. The lead screw 48 moves axially through the cover tubes 56, 58 as the lead screw 48 moves the center windowpane 36 between the open and closed positions. The cover tubes 56, 58 encapsulate the lead screw 48 removing it from the environment within the passenger compartment.

Figure 4:
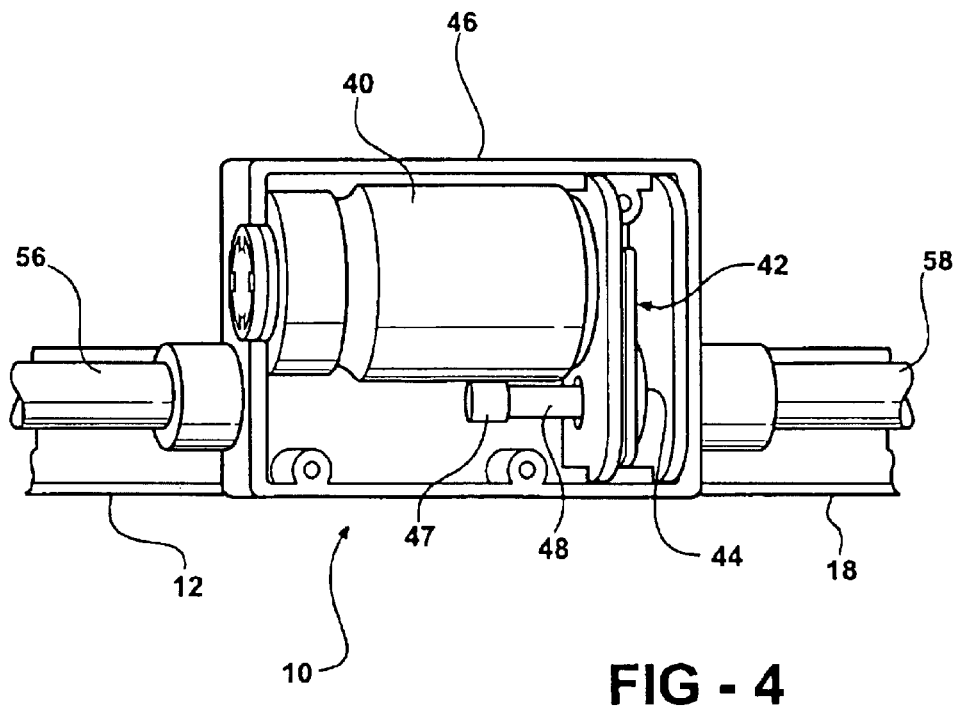
FIG. 4 is an enlarged perspective view, partially cut away, of one embodiment of the invention.
Figure 5:
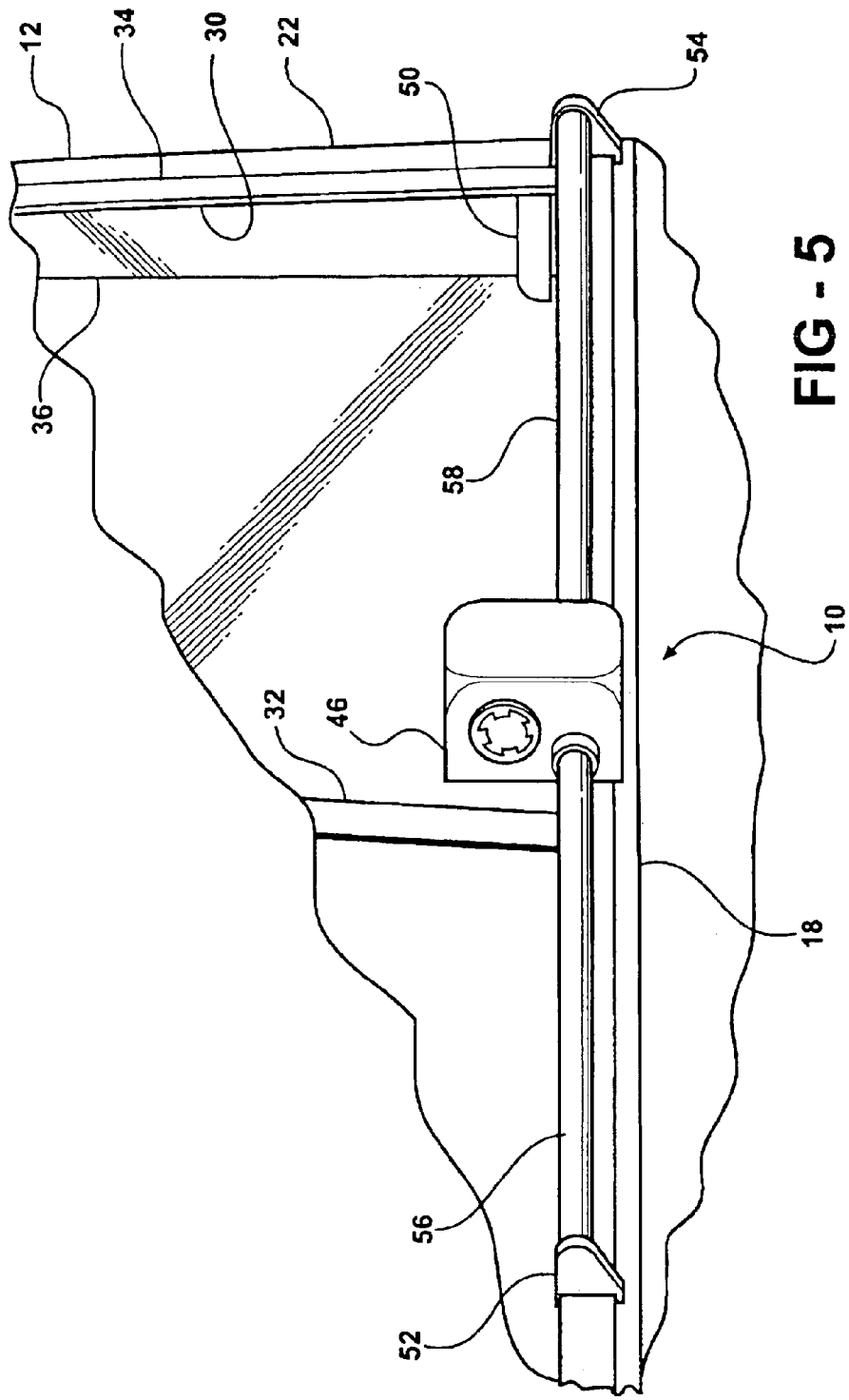
FIG. 5 is a perspective view, partially cut away, of one embodiment of the invention.

In operation, when the center windowpane 36 in the closed position, the free end 47 of the lead screw 48 is disposed adjacent the end support 52. The motor 40 is activated to generate a rotational force. The rotational force is transferred by the drive nut 44 to drive the lead screw 48 axially alongside the track 26 toward the end support 54. The bracket 50 travels with the lead screw 48 to move the center windowpane 36 to the open position as the lead screw 48 is driven axially. The bracket 50 also prevents the lead serew 48 from rotating with the drive nut 44. The lead screw 48 will continue to move axially until the free end 47 thereof exits the cover tube 56 (FIG. 4).

To move the center windowpane 36 back to the closed position, the motor 40 is activated to generate a rotational force in an opposite direction. The drive nut 44 transfers the rotational force to drive the lead screw 48 axially towards the end support 52. The bracket 50 travels with the lead screw 48 to move the center windowpane 36 to the closed position.

Figure 6:
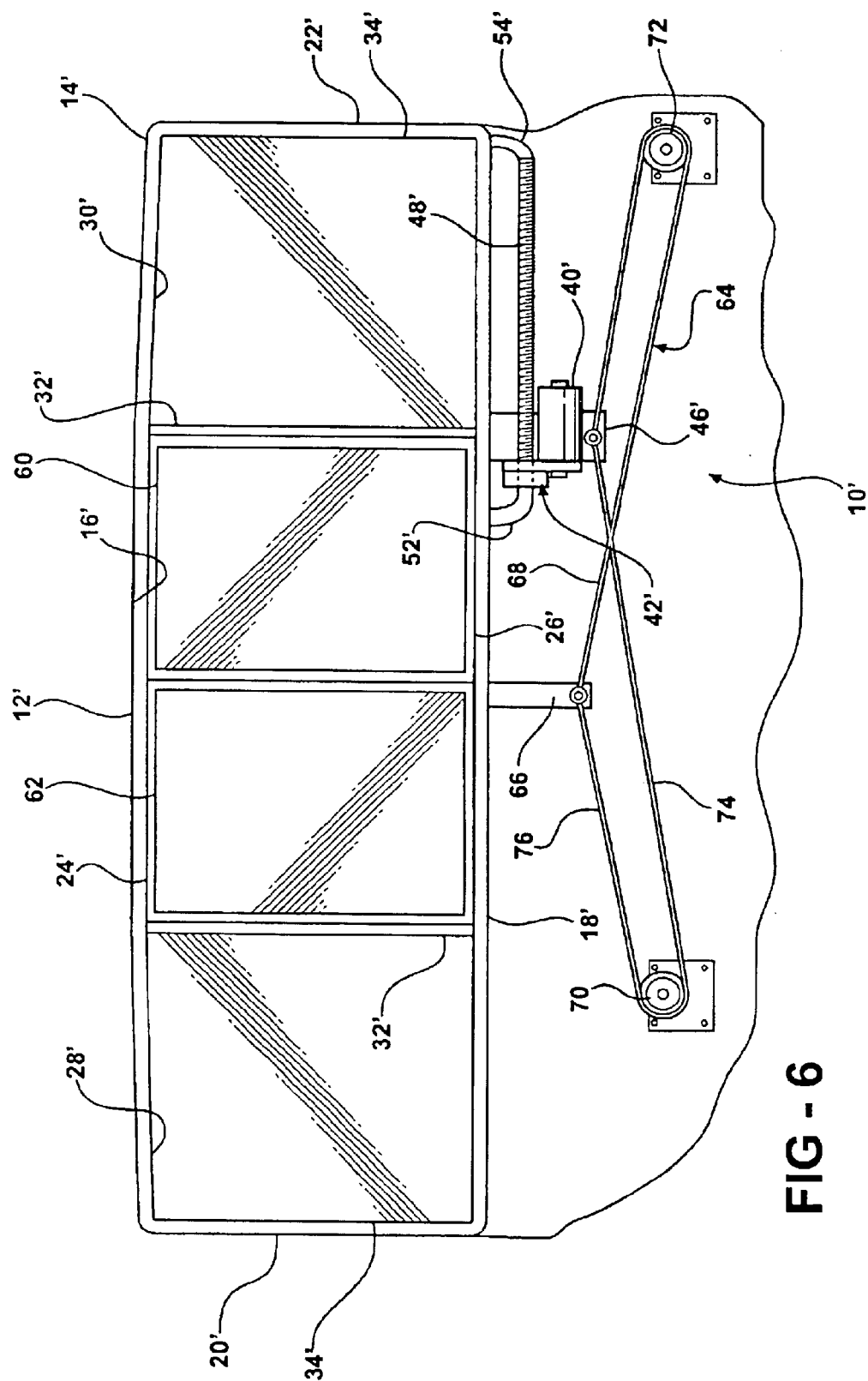
FIG. 6 is a side view of a second embodiment of the invention.

Referring to FIG. 6, wherein like primed reference numerals represent similar elements as those described above, in a second embodiment of the invention the power sliding assembly 10' is adapted to move first 60 and second 62 central windowpanes between an open position and a closed position. The motor bracket 46' is fixedly secured to the first central windowpane 60 and to the motor 40', which generates a rotational force upon activation.

The lead screw 48' is fixedly secured to the track 26' by the end supports 52', 54'. The lead screw 48' extends between the end supports 52', 54'. The lead screw 48' extends through the motor bracket 46' and is operatively engaged with the motor 40' to translate the rotational force therefrom into an axial force. The drive mechanism 42', which includes the drive nut 44', transfers the rotational force away from the motor 40' and toward the lead screw 48'. The motor bracket 46' and the motor 40' move along the lead screw 48' to move the first central windowpane 60 between the open and closed positions.

A cable system, generally shown at 64, moves the second central windowpane 62 along the track 26' complementarily to the first central windowpane 60. In other words, the second central windowpane 62 moves to the open position when the first central windowpane 60 moves to the open position, and the second central windowpane 62 moves to the closed position when the first central windowpane 60 moves to the closed position. A window bracket 66 is fixedly secured to the second central windowpane 62.

A cable 68 extends between the window bracket 66 and the motor bracket 46'. The cable 68 also extends around a plurality of pulleys 70, 72 between the window bracket 66 and the motor bracket 46'. When the lead screw 48' applies the axial force to the motor bracket 46' and the motor 40' to move the first central windowpane 60 towards the side 22' of the window frame 12' (from left to right in FIG. 6), a first segment 74 of the cable 68 is pulled by the motor bracket 46' from left to right. As the first segment 74 of the cable 68 is being pulled by the motor bracket 46', the one of the plurality of pulleys 70 causes a second segment 76 of the cable 68 to be pulled in an opposite axial direction (from right to left in FIG. 6) than the first segment 74. The second segment 76 of the cable 68 pulls the window bracket 66, and with it, the second central windowpane 62, towards the side 20' of the window frame 12'. Thus, the plurality of pulleys 70, 72 inverts the axial force applied to the motor bracket 46' and applies that inverted axial force to the window bracket 66. As a result, the cable system 64 allows the first 66 and second 68 central windowpanes to move simultaneously in opposite axial directions between the open and closed positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A power sliding assembly for moving a windowpane within a track formed within a window frame between an open position and a closed position, said power sliding assembly comprising:

a motor adapted to be fixedly secured to the window frame, said motor generating a rotational force;

a lead screw operatively connected to said motor, said lead screw receives said rotational force and moves axially alongside the track; and a bracket fixedly secured to said lead screw and adapted to be secured to the windowpane wherein said bracket moves the windowpane between the open and closed positions as said bracket travels with said lead screw as said lead screw is driven axially alongside the track.

2. The power sliding assembly as set forth in claim 1 including a drive mechanism operatively connected to said motor for transferring said rotational force away from said motor and toward said lead screw.

3. The power sliding assembly as set forth in claim 2 wherein said drive mechanism includes a drive nut rotatably connected to said motor.

4. The power sliding assembly as set forth in claim 3 wherein said lead screw extends through said drive nut.

5. The power sliding assembly as set forth in claim 4 wherein said drive nut threadedly engages and drives said lead screw upon activation of said motor.

6. The power sliding assembly as set forth in claim 5 including end supports adapted to be secured to the window frame.

7. The power sliding assembly as set forth in claim 6 including a motor bracket adapted to be fixedly secured to the window frame and said motor.

8. The power sliding assembly as set forth in claim 7 wherein said motor bracket is positioned between said end supports.

9. The power sliding assembly as set forth in claim 8 including cover tubes extending between said motor bracket and each of said end supports.

10. The power sliding assembly as set forth in claim 9 wherein said cover tubes are coaxial.

11. The power sliding assembly as set forth in claim 10 wherein said lead screw travels axially through said cover tubes.

12. A power sliding assembly for moving a first and second central windowpane along a track between an open position and a closed position, said power sliding assembly comprising:

a motor bracket adapted to be secured to the first central windowpane;

a motor fixedly secured to said motor bracket, said motor generating a rotational force; and a lead screw adapted to be fixedly secured to the track and operatively engaged with said motor such that said lead screw translates said rotational force into an axial force to move the first central windowpane, said motor bracket, and said motor along said lead screw and the track to move the first central windowpane between the open and closed positions.

13. The power sliding assembly as set forth in claim 12 including a cable system for moving the second central windowpane along the track complementarily to the first central windowpane.

14. The power sliding assembly as set forth in claim 13 wherein said cable system includes a window bracket adapted to be fixedly secured to the second central windowpane.

15. The power sliding assembly as set forth in claim 14 wherein said cable system includes a cable extending between said motor bracket and said window bracket.

16. The power sliding assembly as set forth in claim 15 including a plurality of pulleys for inverting said axial force applied to said window bracket from said axial force being applied to said motor bracket.

17. The power sliding assembly as set forth in claim 16 wherein said lead screw extends through said motor bracket.

18. The power sliding assembly as set forth in claim 17 including end supports secured to said lead screw.

19. The power sliding assembly as set forth in claim 18 wherein said lead screw extends between said end supports.

20. The power sliding assembly as set forth in claim 19 wherein the first central windowpane, said motor bracket, and said motor can move between said end supports.

21. The power sliding assembly as set forth in claim 20 wherein said lead screw is threaded.

22. The power sliding assembly as set forth in claim 21 including a drive mechanism operatively connected to said motor for transferring said rotational force away from said motor and toward said lead screw.

23. The power sliding assembly as set forth in claim 22 wherein said drive mechanism includes a drive nut rotatably connected to said motor.

24. The power sliding assembly as set forth in claim 23 wherein said lead screw extends through said drive nut.

25. The power sliding assembly as set forth in claim 24 wherein said lead screw threadedly engages said drive nut to move the first central windowpane, said motor bracket, and said motor along said lead screw.

* * * * *